United States Patent [19]

Shelton

[11] 4,100,957
[45] Jul. 18, 1978

[54] SCREENS FOR SIDE AND REAR DOOR OPENINGS OF VANS AND LIKE VEHICLES

[75] Inventor: Warren E. Shelton, 15733 Pearl Rd., Cleveland, Ohio 44136

[73] Assignee: Warren E. Shelton, Cleveland, Ohio

[21] Appl. No.: 827,354

[22] Filed: Aug. 24, 1977

[51] Int. Cl.$^2$ .............................................. A47H 3/00
[52] U.S. Cl. ................. 160/368 R; 160/354; 160/DIG. 18
[58] Field of Search ............ 160/330, 368 R, DIG. 18

[56] References Cited

U.S. PATENT DOCUMENTS

| 2,223,477 | 12/1940 | Bernier | 160/DIG. 18 |
|---|---|---|---|
| 3,632,154 | 1/1972 | Woodrich | 160/330 |
| 3,753,458 | 8/1973 | Lazarek | 160/368 R |
| 3,763,917 | 10/1973 | Antinone | 160/368 R |
| 3,871,700 | 3/1975 | Brownlee | 160/330 |

FOREIGN PATENT DOCUMENTS 944,994  12/1963  United Kingdom ................. 160/354

Primary Examiner—Kenneth Downey
Attorney, Agent, or Firm—Isler and Ornstein

[57] ABSTRACT

Screens are disclosed which are especially designed for use for the side and rear door openings of vans and like vehicles. The screens are provided at their marginal portions with fasteners of the Velcro type or snap fastener type, whereby they may be detachably secured to portions of the van adjacent the door openings, and which are provided with like fasteners or fastening means. The screens are provided centrally thereof with zippers, which may be opened to permit access of persons through the screens and into the van. The screens, when not in use, may be quickly and easily detached from the van, and folded for storage purposes.

8 Claims, 10 Drawing Figures

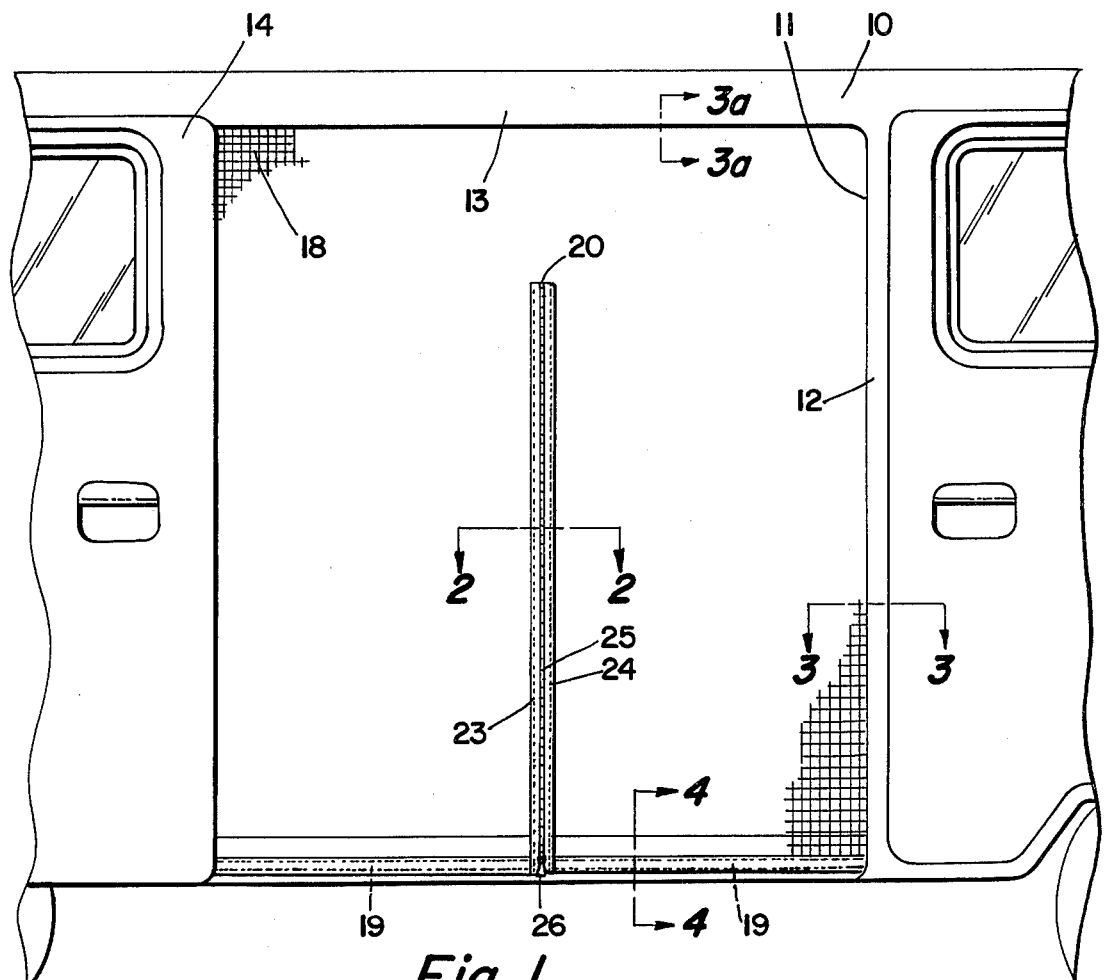
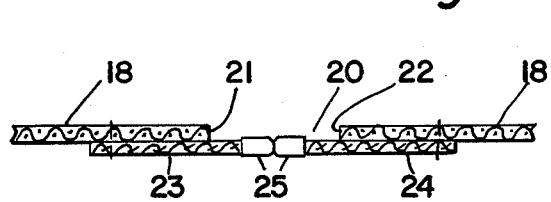
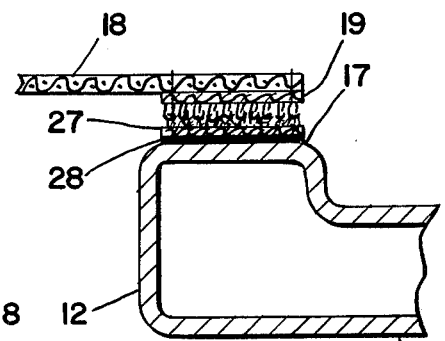
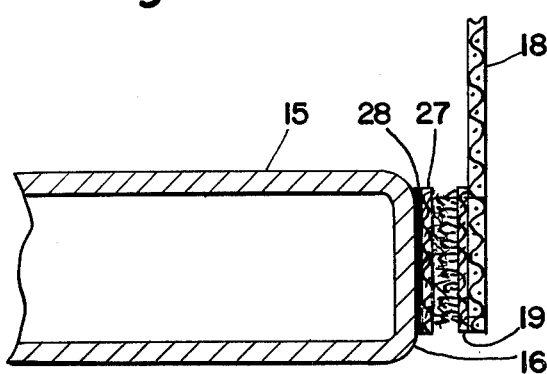
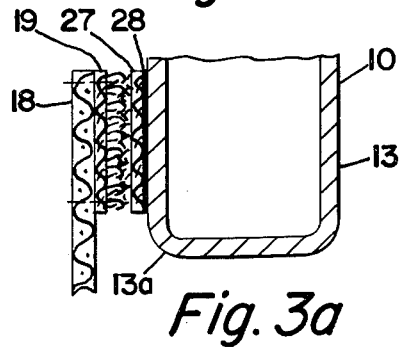

SCREENS FOR SIDE AND REAR DOOR OPENINGS OF VANS AND LIKE VEHICLES

This invention relates, as indicated, to screens for vans and like vehicles, but has reference more particularly to screens for the side and rear door openings of such vans.

Vans and other like vehicles are usually provided at the sides thereof, with large openings, which are normally closed by means of doors hinged to the vehicle, or by sliding doors mounted on the vehicle.

These openings are rather large in dimensions, and are contoured vertically and horizontally to conform to the contour of the exterior of the vehicle.

For this reason, it has heretofore been difficult to mount a conventional flat framed screen in the opening, while, at the same time, providing a satisfactory means of gaining access to the interior of the vehicle without removing the screen.

The door opening extends downwardly, but is not closed at the bottom, so that the portion of the floor of the vehicle adjacent the door opening is recessed inwardly away from the door opening and out of the general plane of the door opening.

Due to the large size or dimensions of a conventional screen designed to fit such door openings, a screen for this purpose consisting of screening mounted in a conventional rigid metallic or plastic frame would be prohibitive in cost and extremely difficult to install in such a manner as to prevent entrance of flies and other insects into the interior of the vehicle through openings or gaps between the screen and portions of the vehicle on which the screen is mounted.

The present invention, accordingly, has, as its primary object, the provision of a screen for side door openings of a vehicle which is characterized by a flexibility of construction such as to enable the screen to be easily installed on a vehicle in a manner which avoids formation of gaps or openings between the screen and portions of the vehicle on which the screen is mounted, thereby inhibiting entrance of flies and other insects into the vehicle through such gaps or openings.

Another object of the invention is the provision of a screen of the character described, having means for enabling a person or child to pass into and out of the vehicle through the screen and without removing the screen from the vehicle.

Another object of the invention is to provide a screen of the character described, having a frame of inexpensive non-metallic, flexible material encompassing the screen, whereby the screen may be mounted on the vehicle adjacent the door opening by attaching the frame to portions of the vehicle of rounded or irregular contour.

A further object of the invention is to provide a screen of the character described, which is made, in its entirety, of inexpensive, readily available materials, which can be quickly and easily manufactured and assembled to sell at a low price.

Other objects and advantages of my invention will be apparent during the course of the following description.

In the accompanying drawings forming a part of this specification, and in which like numerals are employed to designate like parts throughout the same, FIG. 1 is a fragmentary side elevation of a van or like vehicle, showing a side door opening of the vehicle and a preferred embodiment of the screen mounted on the vehicle behind the door opening;

FIG. 2 is a fragmentary cross-sectional view, on an enlarged scale, taken on the line 2—2 of FIG. 1;

FIG. 3 is a fragmentary cross-sectional view, on an enlarged scale, taken on the line 3—3 of FIG. 1;

FIG. 3a is a fragmentary cross-sectional view, on an enlarged scale, taken on the line 3a—3a of FIG. 1;

FIG. 4 is a fragmentary cross-sectional view, on an enlarged scale, taken on the line 4—4 of FIG. 1;

Figure 5:
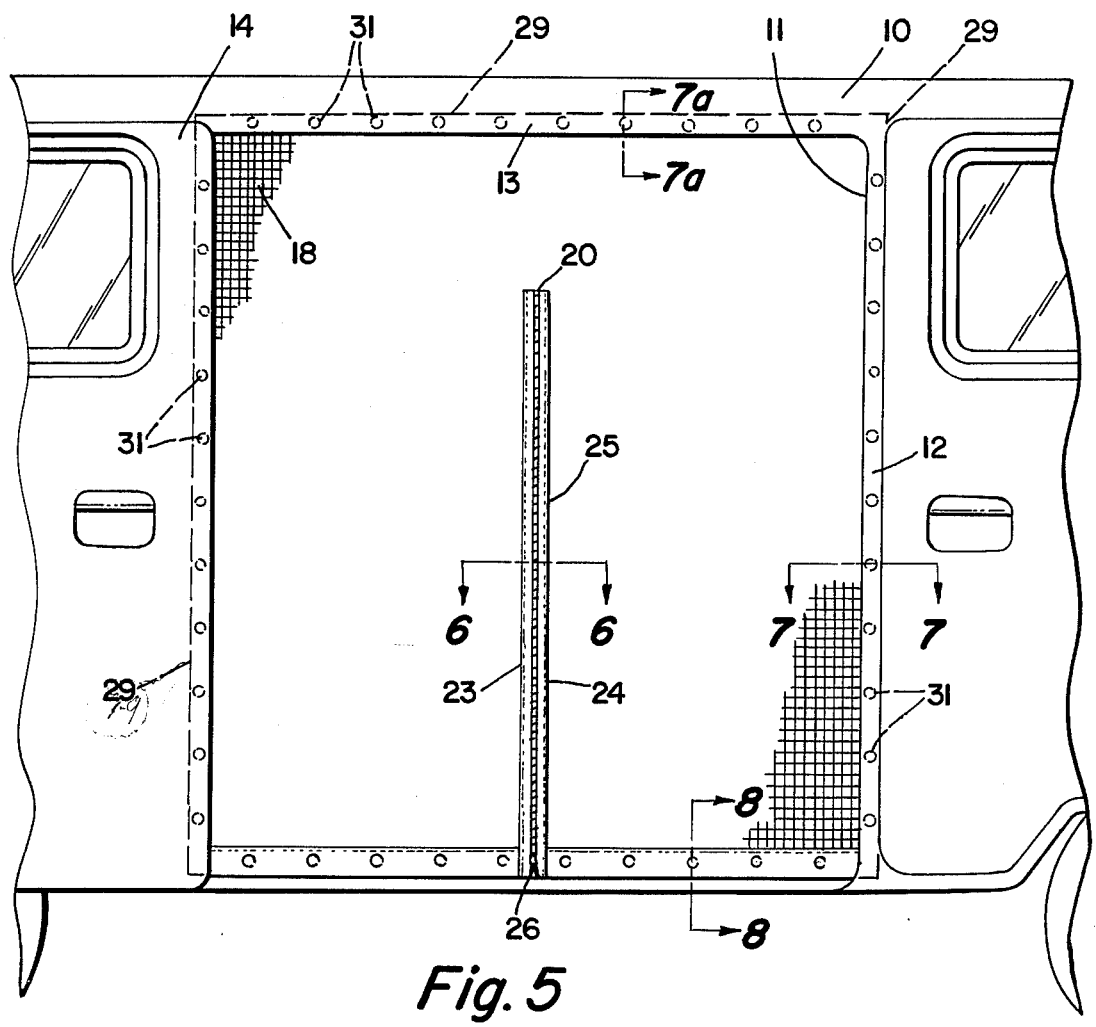
FIG. 5 is a view similar to FIG. 1, but showing a modification of the invention.
Figure 6:
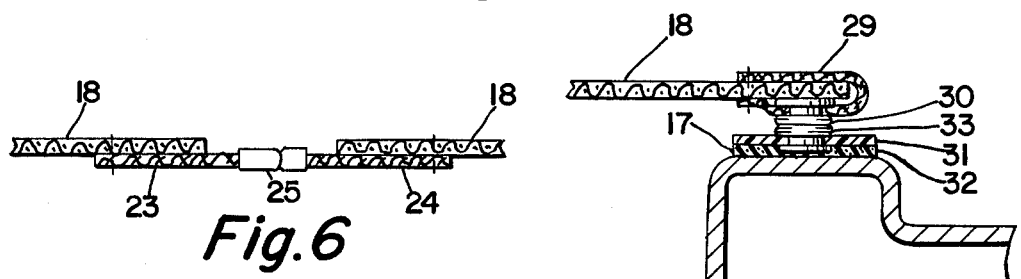
FIG. 6 is a fragmentary cross-sectional view, on an enlarged scale, taken on the line 6—6 of FIG. 5.
Figure 7:
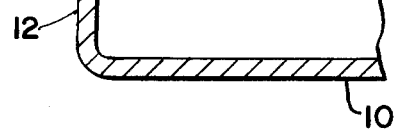
FIG. 7 is a fragmentary cross-sectional view, on an enlarged scale, taken on the line 7—7 of FIG. 5.
Figure 8:
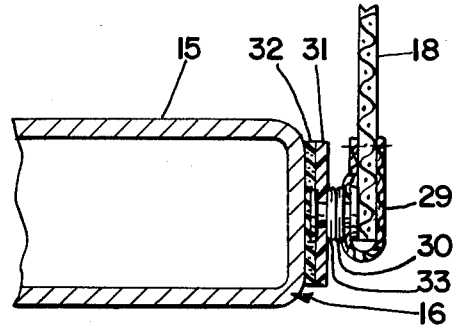
Figure 7A:
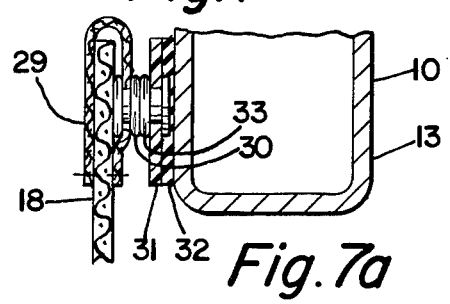

FIG. 7a—7a is a fragmentary cross-sectional view, on an enlarged scale, taken on the line 7a—7a of FIG. 5, and FIG. 8 is a fragmentary cross-sectional view, on an enlarged scale, taken on the line 8—8 of FIG. 5.

Referring more particularly to FIGS. 1 to 4 inclusive, reference numeral 10 designates a van or like vehicle having a side door opening 11 of substantially rectangular shape, which is open at the bottom, and defined at its sides by body posts 12 and at the top by a body cross-beam 13 of U-shaped cross-section.

In this instance, the opening 11 is adapted to be closed by a sliding door 14.

The floor of the van is indicated by reference numeral 15, and the side edge of the floor, which is spaced inwardly from the opening 11 is designated by reference numeral 16.

The rear or inboard faces of the body posts 12 are indicated by reference numeral 17, and the rear or inboard face of the cross-beam 13 is indicated by reference numeral 13a (FIG. 3a).

For the purpose of closing the door opening 11, a screen is provided of substantially rectangular configuration, and of dimensions commensurate with the dimensions of the opening 11.

The screen comprises a panel 18 of screening material, such, for example, as Nylon or the like, having a strip 19 of Velcro hook tape sewn to the front faces of the marginal portions of the sides and top of the panel 18, as best seen in FIGS. 3 and 3a.

The panel 18 also has a strip 19 of Velcro hook tape sewn to the rear face of the marginal portion of the bottom of the panel 18, as best seen in FIG. 4.

For the purpose of entering or leaving the van through the screen, the panel 18 is provided with a recess or cut-out 20 which extends from the bottom of the panel to a point spaced from the upper edge of the screen, as best seen in FIG. 1. The side edges of this recess are designated by reference numerals 21 and 22, as best seen in FIG. 2.

Sewn to the front of the panel 18, adjacent the edges 21 and 22, are tapes 23 and 24 provided with zipper elements 25, as best seen in FIG. 2. The zipper is adapted to be opened or closed by a zipper actuating element 26 (FIG. 1).

Secured to the flat inboard surfaces 17 of the posts 12 and the flat inboard surface 13a of the cross-beam 13 are strips 27 of Velcro loop tape. The tapes 27, as seen in FIGS. 2, 3 and 3a, are provided with backings 28 of a pressure-sensitive adhesive material, whereby the tapes 27 may be adhesively secured to the surfaces 17 and 13a by manual pressure.

Secured to the flat side edge surface 16 of the floor 15 are strips 27 of Velcro loop tape. The tape 27, as best seen in FIG. 4, is provided with a backing 28 of a pressure-sensitive adhesive material, whereby the tape 27 may be adhesively secured to the surface 16 by manual pressure.

The screen is secured in position within the vehicle by pressing the hook tapes 19 against the loop tapes 27. The tapes 27 on the inwardly spaced or recessed floor edges and on the inboard posts and cross-beam surfaces are normally in substantial alignment and therefore when the tapes have been properly positioned, in the manner shown in FIGS. 2, 3, 3a and 4, the screen will be fairly flat or taut.

When the screen is to be removed from the van, for storage or other purposes, it is only necessary to pull the strips 19 away from the strips 27, and fold the screen.

In FIGS. 5, 6, 7, 7a and 8, a modification is shown in which, in lieu of Velcro or Velcro-type fasteners for securing the screen to the van, fasteners of the snap-type are employed.

For this purpose, the screen comprises a panel 18 of screening material, such, for example, as Nylon or the like, having folded fabric tapes 29 sewn to and embracing the marginal portions of the sides, top and bottom of the panel 18, as best seen in FIGS. 5, 7, 7a and 8.

Permanently secured to the outboard portions of the tapes 29, as best seen in FIGS. 7 and 7a, are the male portions or halves of snap fasteners 30. These portions are spaced at intervals of about 6 inches along the tapes 29.

Permanently secured to the inboard portions of the tapes 29, as best seen in FIG. 8, are the male portions or halves of snap fasteners 30, which are similarly spaced at intervals of about 6 inches along the tapes 29.

Secured to the flat surfaces 17 of the posts 12, the flat surface 13a of the cross-beam 13, and the flat surface 16 of the floor 15, at intervals spaced to correspond with the spacing of the fasteners 30, are discs 31 of a plastic or plastic-like material.

The discs 31 have adhesively secured thereto discs 32 of a pressure-sensitive material, whereby the discs 31 may be secured to the surfaces 17, 13a and 16 by manual pressure applied to the discs 31, as best seen in FIGS. 7, 7a and 8.

The discs 31 have secured thereto, the female portions or halves of snap fasteners 33.

The screen of FIG. 5 is secured in position within the vehicle by snapping the fastener halves 30 into the fastener halves 33. When thus secured, the screen will be fairly flat and taut.

When the screen is to be removed from the van for storage or other purposes, it is only necessary to pull the fastener halves 30 from the fastener halves 33, and fold the screen.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. In combination with a side or rear door opening of a van or like vehicle, fastening means secured to the interior of said vehicle adjacent the sides and top of said opening and facing the interior of said vehicle, a screen having marginal portions provided with fastening means secured to said first-named fastening means and facing in a direction exteriorly of said vehicle and removable from said first-named fastening means by a stripping action, a vehicle floor having an edge recessed from said opening, additional fastening means secured to the recessed floor edge adjacent said opening and facing in a direction exteriorly of said vehicle, said screen having a marginal portion provided with fastening means secured to said additional fastening means and removable from said additional fastening means by a stripping action, the fastening means on said last-named marginal portion facing in a direction interiorly of said vehicle.

2. The combination, as defined in claim 1, in which means are provided in said screen for opening said screen to permit access to and from the interior of the vehicle.

3. The combination, as defined in claim 2, wherein said first-named fastening means comprises a Velcro tape, said second-named fastening means comprises a Velcro tape coacting with said first tape and adapted to be stripped from said first-named tape for removing the screen from the vehicle, said additional fastening means comprises a Velcro tape and said fastening means on said last-named marginal portion comprising a Velcro tape adapted to be stripped from said Velcro tape comprising said additional fastening means.

4. The combination as defined in claim 2, wherein said first-named fastening means comprises spaced snap fasteners, said second-named fastening means comprises snap fasteners spaced to correspond with the spacing of the first-named snap fasteners, said additional fastening means comprises spaced snap fasteners, and said fastening means on said last-named marginal portion comprises snap fasteners spaced to correspond with the spacing of said additional fastening means.

5. In combination with a van or like vehicle having a door opening, and a floor having an outer side edge spaced inwardly from said door opening, fastening means secured to the interior of the van adjacent the sides and top of said opening and facing the interior of said vehicle, fastening means secured to said floor outer edge and facing in a direction exteriorly of said vehicle, and a screen having marginal portions at the top and sides provided with fastening means removably secured to said first-named fastening means and facing in a direction exteriorly of said vehicle, said screen having a marginal portion at the bottom provided with fastening means removably secured to said second-named fastening means and facing in a direction interiorly of said vehicle.

6. The combination, as defined in claim 5, wherein all of said fastening means comprise Velcro tape.

7. The combination, as defined in claim 5, wherein all of said fastening means comprise snap fasteners.

8. The combination, as defined in claim 5, in which means are provided in said screen for opening said screen to permit access to and from the interior of the vehicle, without removing the screen from the vehicle.

* * * * *